Aug. 12, 1958 W. E. POLK 2,846,798
ELECTRO MECHANICAL BIRD DEVICE
Original Filed June 25, 1953 2 Sheets-Sheet 1
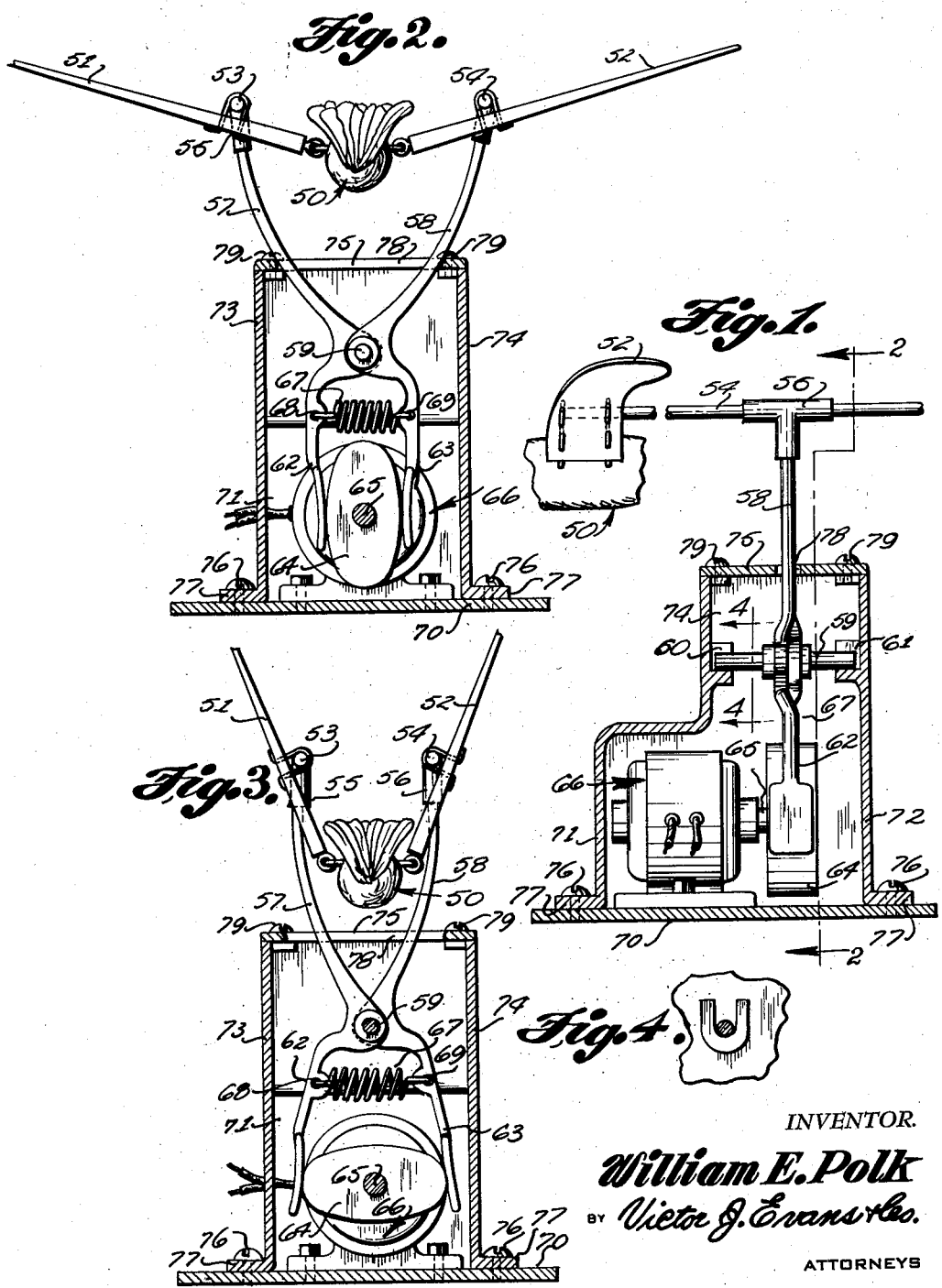
INVENTOR.
William E. Polk
BY Victor J. Evans & Co.
ATTORNEYS Aug. 12, 1958  W. E. POLK  2,846,798
ELECTRO MECHANICAL BIRD DEVICE
Original Filed June 25, 1953  2 Sheets-Sheet 2
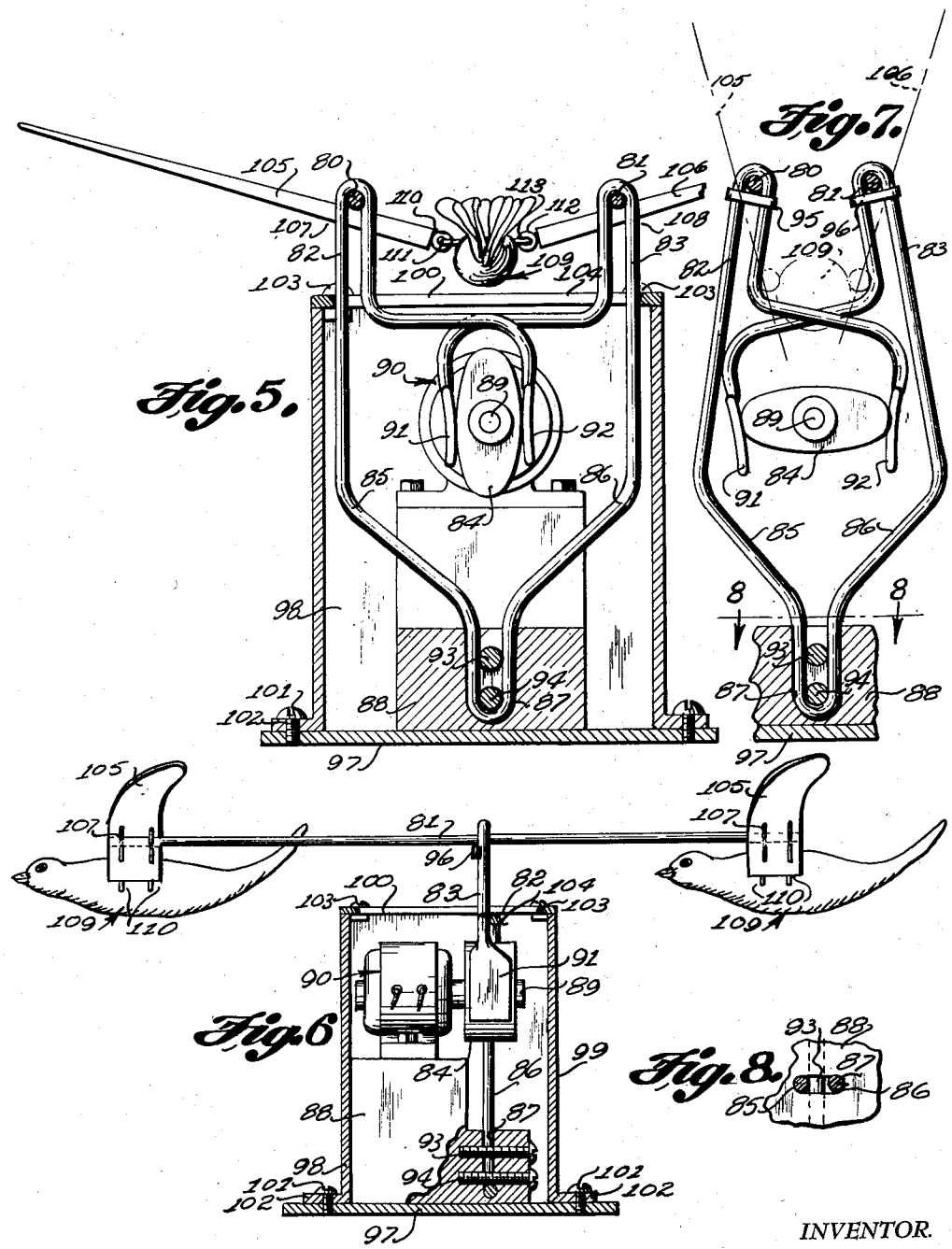
INVENTOR.
William E. Polk
BY Victor J. Evans & Co.
ATTORNEYS

United States Patent Office 2,846,798
Patented Aug. 12, 1958

2,846,798
ELECTRO MECHANICAL BIRD DEVICE
William Eugene Polk, New York, N. Y.

Original application June 25, 1953, Serial No. 364,019, now Patent No. 2,770,918, dated November 20, 1956. Divided and this application September 28, 1956, Serial No. 613,362

4 Claims. (Cl. 40—106.33)

This invention relates to power activated toys, and in particular a bird or birds suspended from cam and solenoid actuated arms with the arms pivotally connected to wings of the bird and with the wings pivotally connected to the body of a bird.

This invention is a divisional application which has been divided from application Serial No. 364,019, filed June 25, 1953, and matured to Patent No. 2,770,918, dated November 20, 1956.

The purpose of this invention is to imitate, by mechanical means in a conventional toy a bird in flight wherein an animal or body of an animal is suspended between two points, and wherein the body or elements thereof are actuated by contracting and expending the points from which the animal is suspended.

Various types of mechanical devices have been provided for suspending birds and other animals to provide means for activating parts of the birds or animals, such devices originating in the original toy wherein a monkey was suspended by elastic cords between spring arms and wherein the monkey turned somersaults and was raised and lowered by expanding and contracting the arms. With this thought in mind this invention contemplates a combination of a body suspended between arms with power means for actuating the arms whereby the arms are adapted to be expanded and contracted by electrically operated devices so that the devices may operate continuously.

The object of this invention is, therefore, to provide power means for expanding and contracting arms to which toys or parts thereof may be pivotally connected whereby continuous operation of the arms imparts like or a continuous action to the toy or animal.

Another object of the invention is to provide power actuated arms between which an object may be suspended in which different objects may be suspended between the same arms.

A further object of the invention is to provide power means for expanding and contracting arms upon which a toy or toys may be pivotally mounted for actuating the toy in which the device is of a simple and economical construction.

With these and other objects and advantages in view the invention embodies pairs of arms piovtally or resiliently connected with electrically actuated devices operatively connected to the arms for spreading and contracting the arms.

Other features and advantages of the invention will appear from the following description taken in connection with the drawings, wherein:

Figure 1 is a longitudinal section taken through the device wherein horizontally disposed bars are actuated with a motor driven cam.

Figure 2 is a cross section through the device shown in Figure 1 taken on line 2—2 thereof.

Figure 3 is a section similar to that shown in Figure 2 showing the upper ends of the arms contracted by the cam shown in Figures 1 and 2.

Figure 4 is a detail taken on the line 4—4 of Figure 1 showing a bearing, for mounting the shaft on which the arms are pivotally mounted in the housing in which the motor is positioned.

Figure 5 is a longitudinal section through the device illustrating a modification wherein spring actuated arms are spread by a motor driven cam.

Figure 6 is a longitudinal section through the device shown in Figure 5 with the parts shown on a reduced scale and illustrating birds suspended on both ends of parallel bars actuated by the device.

Figure 7 is a cross section similar to that shown in Figure 5 showing the bars contracted by the cam and with the housing and other parts omitted.

Figure 8 is a detail taken on line 8—8 of Figure 7 showing the mounting of the spring actuated arms in a mounting block in the housing.

Referring to Figures 1, 2 and 3, there is shown a bird having a body 50 with wings 51 and 52 suspended from rods 53 and 54 respectively and extended from T-fittings 55 and 56 on the upper ends of arms 57 and 58, respectively.

The arms 57 and 58 are pivotally mounted on a pin 59, the ends of which are held in bearings 60 and 61 and depending fingers 62 and 63 extended from the arms 57 and 58, respectively are positioned to engage the surface of a cam 64 carried by a shaft 65 and actuated by a motor 66. The fingers 62 and 63 are resiliently held against the face of the cam with a spring 67, one end of which is secured in an eye 68 of the finger 62 and the other in an eye 69 of the finger 63.

The parts are positioned in a housing having a base 70 with end walls 71 and 72, side walls 73 and 74, and a cover plate 75. The side and end walls are secured to the base 70 with screws 76 that extend through flanges 77 and the cover plate, which is provided with an elongated slot 78 is secured to the upper end of the housing with screws 79.

The rods 53 and 54 may extend from one or both of the ends of the fittings 55 and 56 whereby birds or other animals may be positioned at one or both of the ends of the device. As the motor is started the fingers 62 and 63 are spread by the cam 64 to the position shown in Figure 3 and as the cam continues to rotate the spring 67 draws the fingers together, spreading the upper ends of the arms 57 and 58. By this means the upper ends of the arms are expanded and contracted to actuate the wings of the bird.

In the design illustrated in Figures 5, 6 and 7, a pair of birds is carried by parallel bars 80 and 81 and the bars, which are secured in the upper ends of yokes 82 and 83, respectively are contracted by a cam 84, similar to the cam 64 and expanded by spring inherent in spring arms 85 and 86 which are mounted in a socket 87 of a block 88 and on the upper ends of which the yokes 82 and 83 are positioned.

The cam 84 is mounted on a motor shaft 89 extended from a motor 90, which is also mounted on the block 88 and the motor is positioned whereby the cam 84 engages fingers 91 and 92 extended from the inner members of the yokes 82 and 83 respectively.

The lower ends of the arms 85 and 86 are secured in the socket 87 of the block 88 with bolts 93 and 94 and the rods 80 and 81 are secured in the upper ends of the yokes with bands 95 and 96, as shown in Figure 7.

In this design the operating parts are enclosed in a housing having a base 97 with end walls 98 and 99 and a cover plate 100. The side and end walls are secured to the base with bolts 101 which extend through flanges 102 and the cover plate is secured to the housing with bolts 103.

The cover plate 100 is provided with an elongated slot 104 through which the yokes 82 and 83 extend, and as illustrated in Figure 5, wings 105 and 106, which are secured to the rods 80 and 81 with fasteners 107 and 108, respectively are pivotally mounted on the sides of a body 109 with eyes 110 of the wings 105 secured in eyes 111 on one side of the body 109 and with eyes 112 of the wings 106 extended through eyes 113 on the opposite side of the body.

With the parts mounted in this manner birds carried by the ends of the rods 80 and 81 are activated by the spreading and contracting actions of the spring arms 85 and 86, the arms being expanded by spring inherent therein and contracted by the cam 84, as illustrated in Figure 7.

In the different designs the expanding or spreading action of the arms causes the wings of the birds to spread to substantially horizontally disposed positions and the contracting action causes the wings to extend upwardly as shown in Figure 3 and with the parts actuating continuously the wings of the birds move upwardly and downwardly imitating birds in flight.

It will be understood that other modifications, within the scope of the appended claims, may be made in the design and arrangement of the parts without departing from the spirit of the invention.

I claim:

1. In a toy, housing, a fanciful body arranged above said housing and including a pair of movable wings horizontally disposed rods for supporting said wings, T-shaped fittings connected to said rods, arcuate arms having their upper ends secured to said fittings, a pin extending through said arms providing a pivotal support for said arms, bearings mounted in said arms for supporting said pin, fingers having a flattened portion thereon depending from said arms, a cam engaged by the flattened portions of said fingers, a shaft connected to said cam, a motor for rotating said shaft, and a coil spring having its ends connected to said fingers intermediate of the flattened portions of said fingers and the pivotal connections of said arms.

2. In a toy, a housing, a fanciful body arranged above said housing and including a pair of movable wings, horizontally disposed rods for supporting said wings, T-shaped fittings connected to said rods, arcuate arms having their upper ends secured to said fittings, a pin extending through said arms providing a pivotal support for said arms, bearings mounted in said arms for supporting said pin, fingers having a flattened portion thereon depending from said arms, a cam engaged by the flattened portions of said fingers, a shaft connected to said cam, a motor for rotating said shaft, and a coil spring having its ends connected to said fingers intermediate of the flattened portions of said fingers and the pivotal connections of said arms, a base for supporting said housing, said housing including end walls, side walls and a cover plate.

3. In a toy, a pair of spaced parallel bars, a pair of fanciful bodies carried by said bars, yokes for supporting said bars, a block, spring arms extending upwardly from said block and terminating in said yokes, there being a socket in said block for receiving said spring arms, a motor mounted on said block, a shaft driven by said motor, a cam connected to said shaft, fingers extending from said yokes and engaged by said cam.

4. In a toy, a pair of spaced parallel bars, a pair of fanciful bodies carried by said bars, yokes for supporting said bars, a block, spring arms extending upwardly from said block and terminating in said yokes, there being a socket in said block for receiving said spring arms, a motor mounted on said block, a shaft driven by said motor, a cam connected to said shaft, fingers extending from said yokes and engaged by said cam, a housing arranged below said fanciful bodies, a base for supporting said housing, said housing including end walls and a cover plate, said cover plate being provided with a slot for the projection therethrough of said yokes.

References Cited in the file of this patent

UNITED STATES PATENTS

| | | |
|---|---|---|
| 1,239,040 | Radkoff | Sept. 4, 1917 |
| 1,632,158 | Alexander | June 14, 1927 |
| 2,382,091 | Olson | Aug. 14, 1945 |
| 2,576,209 | Berger | Nov. 27, 1951 |